Nov. 25, 1969          F. V. STURM          3,480,538
CATALYST ELECTRODE FOR ELECTROCHEMICAL CELLS
Filed Feb. 1, 1966

United States Patent Office 3,480,538
Patented Nov. 25, 1969

3,480,538
CATALYST ELECTRODE FOR ELECTRO-
CHEMICAL CELLS
Ferdinand V. Sturm, Erlangen, Germany, assignor to
Siemens Aktiengesellschaft, Berlin, Germany, a corporation of Germany
Filed Feb. 1, 1966, Ser. No. 524,225
Claims priority, application Germany, Feb. 5, 1965,
S 95,327
Int. Cl. B01k 3/04
U.S. Cl. 204—290                                    6 Claims

ABSTRACT OF THE DISCLOSURE

Electrode assembly for an electrochemical cell having a side engageable with reaction gas in the cell and a side engageable with electrolyte in the cell includes a non-metallic cover layer on the electrolyte-engaging side thereof, and a layer formed of pulverulent catalyst material located on the gas-engaging side thereof and intermixed with binder material bonding the particles of pulverulent material to one another and to the cover layer.

---

Figure 1:
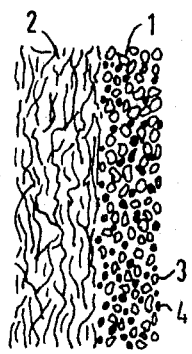

My invention relates to catalyst electrodes for electrochemical cells and more particularly to relatively thin electrodes of $1\mu$ to 1 mm. thickness for fuel cells.

The use of thin electrodes prevents the occurrence of concentration polarizations in the cells normally observed when employing thick electrodes. Such polarizations are caused in the gas-filled pores by depletion of reacting gas, and in the electrolyte-filled pores by changes in concentration of the electrolyte resulting from dilution thereof by water evolving from the reaction. On the other hand, very thin electrodes have only a very limited mechanical strength and can neither be mounted in conventional holder devices nor subjected to conventional operating pressures.

Electrolytic cells have therefore been built in which the electrodes are disposed on the two sides of a diaphragm consisting for example of a flexible ion exchanger and simultaneously serving as a solid electrolyte. Ion exchange resins, as a rule, contain hydration water which may be driven out excessively when operating at elevated temperature with dry gases, particularly air. The ensuing drying of the resin may lead to interruption of the current flow in the cell and, ultimately, to destruction of the diaphragm.

In other devices the electrodes are braced against a rigid MgO skelton containing a molten electrolyte. This requires operating at temperatures of 500 to 700° C. at which the skeleton has been found to become damaged by fissures or cracks. More recently, therefore, this type of structure has been discarded in favor of pastes composed of MgO and molten electrolyte. These pastes, however, are not suitable as an abutment for bracing very thin electrodes against the gas pressures employed so as to provide for sufficient mechanical strength of the electrodes.

Also proposed have been pulverulent electrodes in which the powder is held between screens. These catalyzer-screen electrodes, when operated as gas electrodes in fuel cells or the like, leave much to be desired, because the gas will bubble into the electrolyte already at a slight increase in pressure above the rated operating value, thus causing the necessary three-phase boundary to vanish.

It has been further proposed, therefore, to support thin electrodes by a porous skeleton structure impregnated with an electrolyte and having a reduced pore radius in the region adjacent to the electrodes. A fuel cell with such an electrode assembly is illustrated and described in my co-pending application for Electrochemical Cells, Ser. No. 300,333, filed Aug. 6, 1963, assigned to the assignee of the present invention, and now abandoned.

As will be explained hereinafter, my present invention may be looked upon as an improvement over cells of the type disclosed in the copending application. It will be helpful or necessary, therefore, to first deal with cells according to the copending application more in detail, before describing the improvement features of the present invention.

According to the copending application, the impregnation of the supporting skeleton structure with electrolyte liquid is effected by external pressure or by capillary pressure. Since the operating temperatures of the cell are below 200° C., a wide choice of electrolytes is available so that the ion conductance required for the electrolyte is not limited to only one ion type as with solid electrolytes, nor to a narrowly limited range of ions as with molten electrolytes.

Fine screens or sheets of wire mesh may be employed as electrodes, the wire consisting of catalytically active material. Also suitable are mesh or screen structures and carbon plates upon which the highly active catalyst material is deposited. The desired thin electrodes may also be produced by sintering or pressing of pulverulent material such as Raney-nickel, silver, Raney-silver, catalyst-impregnated carbon or DSK-material. Further suitable are electron-conductive, hydrogen-permeable thin foils which must be supported because of their mechanical instability. Thin electrodes are also obtained by metallizing the supporting skeleton structure. The metallic coating may be produced by known methods, for example by vapor deposition or current-less metallization, the latter method being particularly well suitable for depositing silver, gold and other noble metals. Other catalytically active materials may be deposited on top of the metallic coating, for example by electrolytic deposition.

The reaction gases may be supplied to the cell under superatmospheric pressure. When the pressure in the electrolyte reservoir is equal to atmospheric pressure, the gas pressure in the cell is limited by the capillary pressure of the electrolyte in the supporting skeleton structure. When the pressure is increased, gas bubbles into the skeleton structure and destroys at these localities the three-phase boundary between electrode, electrolyte and gas. Such disturbance or damage can be prevented by placing the electrolyte under pressure, for example under the pressure of one of the two reaction gases by providing for an external pressure coupling between gas space and electrolyte space of the cell.

A penetration of one of the gases into the supporting matrix skeleton structure, the electrolyte volume being enclosed, occurs only if the difference between the gas pressures increases beyond the capillary pressure in the skeleton structure, that is, when the following relation applies:

$$|P_1-P_2|>\frac{2\sigma}{r}$$

In this relation, $P_1$ denotes the pressure of the fuel gas, for example hydrogen. $P_2$ denotes the oxidant gas pressure, for example oxygen, $\sigma$ the surface tension of the electrolyte (assuming that the supporting skeleton material is completely wettable by the electrolyte), and $r$ denotes the pore radius in the skeleton structure. In a cell according to the copending application, therefore, the permissible pressure difference $P_1-P_2$ can be increased if the pore radius $r$ is reduced at least in the region adjacent to the electrodes. Thus, the middle region of the supporting skeleton structure has coarse pores of 0.05 to 2 mm.

width, in contrast to the outer region whose fine pores of reduced diameter have a width of only 0.0002 to 0.08 mm.

In copending application Ser. No. 521,297, filed Jan. 18, 1966, for Electrochemical Cell of which I am applicant conjointly with H. Nischik and E. Weidlich, an active electrode of an electrochemical cell has been described that is essentially formed of catalyst material which is pressed against a supporting porous skeleton structure by means of a sheet member, such as a screen or mesh-work of material having good electrical conductivity. The supporting skeleton structure in such a cell assembly comprises, at least on one side, a cover layer which is gas-tight and ion-conducting in the impregnated condition of the skeleton structure. Due to such construction, the danger of gas penetration from the gas chamber of the electrode into the skeleton structure or supporting frame which carries the electrolyte is even further reduced and a device is produced by means of which the selection of the appropriate gas pressure for independently adjusting the three-phase boundary for both electrodes is possible.

It has been found, however, that the electrodes of electrolytic cells and particularly fuel cells of the type described herein with reference to the aforementioned copending applications are amenable to additional improvement.

More particularly, it is an object of the present invention to provide an electrode which avoids certain difficulties attributable to the fact that the catalyst material is loosely deposited in pulverulent form on the cover layer. Thus, it is one of the objects of this invention to provide an electrode wherein the pulverulent catalyst material will not separate readily from the cover layer when the outer pressure applied thereto is reduced, thereby avoiding current interruptions which would normally occur in the separated regions.

With the foregoing and other objects in view, I provide in an electrochemical cell of the aforementioned type, one or more electrodes of pulverulent catalyst material, the particles of which are bonded to one another and to a porous cover layer by a binder medium consisting, for example, of a powder of glass, Teflon (polytetrafluoroethylene), Plexiglas (methyl methacrylate) or polyethylene, or a dispersion or non-polymerized paste of such powder.

Other features which are considered as characteristic for the invention are set forth in the appended claims.

Although the invention has been described as catalytic electrode for electrochemical cells, it is nevertheless not intended to be limited to the foregoing details, since various modifications and structural changes may be made therein without departing from the spirit of the invention and within the scope and range of equivalence of the claims.

Figure 2:
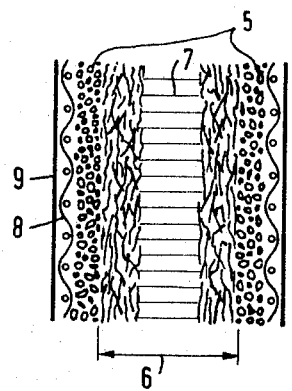

The construction and method of operation of the invention, however, together with additional objects and advantages thereof will be best understood from the following description when read in connection with the accompanying drawings, in which:

FIGS. 1 and 2 are cross-sectional views of two embodiments of an electrolytic or fuel cell electrode constructed in accordance with my invention.

Referring now to the drawings and first particularly to FIG. 1 thereof, there is shown an electrode 1 having a non-metallic cover layer 2, and formed of catalyst particles 3 and binding agent 4 of glass, Teflon (polytetrafluoroethylene), Plexiglas (methyl methacrylate) or polyethylene, for example.

In FIG. 2, electrodes 5 corresponding to the electrode 1 of FIG. 1 are shown combined in one cell, wherein a coarse-pore supporting skeleton structure or frame 7 is located between cover layers 6 and serves to guide the circulation of electrolytes, and functions as a spacer between both electrodes 5. The pulverulent catalyst material is pressed against the supporting structure or frame by a holder in the form of a contact meshwork 8, and the entire cell of FIG. 2 is surrounded by a sheet metal cover or shell 9.

Since, in accordance with my invention, the electrodes are firmly bonded to the non-metallic cover layers, the supporting structure of the electrolyte space can be selected with much coarser pores whereby in turn the circulation of the electrolyte can be increased since the deformations of the cover layer, occurring when gas pressure is applied, do not cause any loosening of the catalyst layer.

Besides being used in fuel cells, the electrodes constructed in accordance with my invention can also be employed in electrolyzers. If gas, such as hydrogen for example, is formed due to electrolysis, it is of particular advantage, when using the novel electrode of my invention, that the gas be formed and collected only on the side of the electrode facing the electrolyte and consequently under pressure separate from the gas arising at the opposite site electrode.

It should be understood that a "screen" is herein meant to denote a layer or sheet which is permeable only in a direction perpendicular to the surface plane thereof whereas a "meshwork," on the other hand, is permeable not only perpendicularly to its surface plane but also in a direction parallel to its surface plane.

The pulverulent catalyst material of the electrode (powder electrode) of this invention should be destructible neither by the electrolyte nor by the particular reaction gas, and its catalytic properties should not be consumed or diminished thereby. It can consist for example of Raney-nickel, silver, Raney-silver, DSK-material or catalyst-impregnated carbon such as platinum coated lamp-black or silver coated activated charcoal. The grain size of the employed powder should be between 0.5 and $200\mu$. On the one hand, the powder grains must be thicker than the pore width of the screen or other gas-permeable sheet member which holds the powder electrode together, and on the other hand, the grains must be maintained as small as possible so as to provide for the greatest possible number of active pores. The pore diameter in the electrode, determined by the grain size, has a lower limit fixed by the pore diameter in the adjacent covering layer, because only when the pores in the electrode are coarser than the pores in the covering layer, is it possible to adjust the three-phase boundary by applying a predetermined gas pressure in the active region. In this respect good results have been obtained with grain sizes between 5 and $100\mu$.

The catalyst powder which forms a sludge due to the fact that it is in part eventually wetted or impregnated with electrolyte is pressed by means of a meshwork and/or screen against the supporting porous skeleton structure or frame to produce an electrode. This is effected, for example, by distributing the catalyst powder uniformly on a screen (for example in a distribution of 0.05 to 1 g. per cm.$^2$). The support frame or skeleton structure with the covering layer is then placed on the powder layer, and the screen and the supporting skeleton structure are then fastened to one another as by means of screws. Depending upon the type of the catalyst powder employed, layer thicknesses of between $1\mu$ and 1 mm. have been found to be sufficient.

Whereas the meshwork or screen which serves to press the catalyst powder against the support frame should have good electrical conductivity, no exacting requirements as to electrical conductivity of the catalyst powder proper are imposed. The powder can be, for example, hundreds of times less conductive electronically than the meshwork or screen. Materials which are good conductors of electrons are suitable for the meshwork or screen if they are neither vulnerable to reaction gas nor, in the event of electrolyte flooding, capable of being attacked by the electrolyte. Nickel, platinum, silver, tantalum and titanium have been found to be suitable for this purpose.

A fuel cell is usually enclosed by a sheet-metal shell enclosure which is spaced from the electrode by suitable spacer means. A second (outer) meshwork can be suitably placed on the aforementioned inner meshwork which presses the catalyst powder of the electrode to the skeleton structure, and can serve as a spacer between the electrode and the metal sheet enclosing the cell. This outer meshwork can be made of any desired material, for example electronically conductive material, which is resistant to the operating conditions of the cell and may have a mesh width and thickness which is greater by a multiple than the corresponding dimensions of the inner meshwork or screen. The outer meshwork can consist of two layers of different thickness and mesh width, of which the one with the narrower mesh openings can be located adjacent to the inner meshwork. The outer meshwork can serve a dual purpose, first to support the inner meshwork and second to provide vacant space in its mesh openings for supplying the particular reaction gas to the powder electrode. This outer meshwork must consequently be gas-permeable both in a direction parallel to the electrode surface and also perpendicular thereto. Furthermore, the outer meshwork, if it is electrically conductive, can also serve to conduct current away from the cell.

If a gas-tight cover layer is provided on only one side of the supporting skeleton structure or frame of a cell, the electrolyte space must then be subjected to the pressure at the side of the supporting skeleton structure which is not provided with the cover layer. If, on the other hand, a cover layer is provided on both sides of the skeleton structure, the possibilities of varying the gas pressure and the pressure of the electrolyte are limited solely by the mechanical stability or strength and by the capillary pressure of the gas-tight cover layers.

The gas-tight cover layers are not completely impervious, but rather have pores with diameters between 0.2 and 80$\mu$ which, during operation, are at least partly filled with electrolyte liquid. Only due to these electrolytes which are retained by capillary forces, are the cover layers able to be gas-tight and ion-conductive. The cover layer must possess, besides the gas-tight characteristic, a high ion conductivity in order to keep the potential drop small in the electrolyte space. The corresponding ion resistance per centimeter square of the cover layer, for example for cells with current densities above 10 ma./cm.$^2$, is preferably smaller than 5$\Omega$.

To increase the ion conductivity, the cover layers are made, on the one hand, very thin and, on the other hand, the freely carried portions of the cover layer located between its supported points must be sufficient strength to withstand the gas pressure or the electrolyte pressure. For these reasons, it has been found to be expedient to select cover layers having a thickness between 0.02 and 1 mm.

When selecting cover layers it must further be observed that the material thereof must be both resistant to the particular reaction gas as well as to the selected electrolyte. To prevent the cover layers from cracking or breaking when assembling the cells, it is furthermore advantageous that the cover layers be flexible.

Examples of suitable cover layers are non-metallic sheets such as asbestos paper or glass-fiber paper, foils of cellulose and of its derivatives. Porous metal foils such as of nickel for example, can also be employed. This is especially permissible if the supporting skeleton structure on which the metal foils serving as cover layers are disposed, is not itself electronically conductive. If both the cover layer and the supporting skeleton structure are electronically conductive, an electronically non-conductive layer can be placed between both thereof in order to prevent a short circuit from electrode to electrode. When the supporting skeleton structure is made of several layers, the non-conductive layer can be interposed between two of the layers of the structure.

The best suitable combination of catalyst powder and cover layer depends on the type of reaction gas, upon the electrolyte (acidic or alkaline, aqueous solution or aqueous melt), and upon the operating temperature.

The operating temperature of the cell is between approximately —30° and +200° C., and depends upon the type of cell and the reaction partners. High efficiencies are obtained for the conversion of hydrogen to electricity at operating temperatures between 10 and 100° C.

Depending upon the materials of the electrodes and the supporting skeleton structure or frame, either acidic or alkaline liquid electrolytes are suitable for the electrodes of the invention. The electrolyte can be either an aqueous solution or a water-containing melt of, for example, NaOH or KOH.

The supporting structure of the electrochemical cell in which the electrolyte is contained, permits both a circulation of the electrolyte through the cell as well as a flow of ion current from electrode to electrode. The supporting structure is thus permeable in two dimensions. Since the supporting structure has no further purpose other than as a guide for the electrolyte and as spacer between the electrodes in the cell, it can be made of any desired mesh-like material. This material need only be resistant to the particular electrolyte and to any ultimately penetrating reaction gas.

The supporting skeleton structure without the cover layers can be provided throughout with uniform pores or can consist for example of three layers of which the middle layer is formed with pores that are coarser than those of both of the outer layers. The coarse-pore region thus provides for the circulation of electrolyte through the cell, and the fine-pore region insures that the cover layer is not pressed into the coarse-pore region and thereby damaged. The transition from coarse pores to fine-pore region can take place continuously or discontinuously whereby the entire supporting skeleton structure can be assembled or composed of layers having various size pores; the supporting structure can consist of uniform or different types of materials, particularly of nickel mesh material. The supporting structure can, however, also be made of plastic material such as, for example, polyethylene, polypropylene or Teflon (polytetrafluoroethylene).

The pore diameter or mesh opening width in the supporting skelton structure can be selected between approximately 0.05 and 2 mm. The larger mesh or pore dimensions serve for a coarse-pore middle layer of the supporting structure in case such a middle layer is used. If the meshes in the supporting structure are uniform throughout, the diameter of the mesh openings is generally only a maximum of about 1 mm.

It is important for the cell that the supporting structure as well as the cover layer and the powder electrode, held in position by a meshwork or screen, be flexible. This is advantageous since the supporting structure will not then suffer any cracks or breaks during the assembly of a cell or an entire battery of cells.

It has been found, as aforementioned, that when pulverulent catalyst material is employed as active electrode, difficulties arise, both when manipulating the individual electrodes and also when assembling them into cells or batteries, which are attributable to the fact that the catalyst powder is placed or deposited loosely on the cover layer.

It has been further found that when there is a reduction in the outer pressure applied to the pulverulent catalyst material in the aforedescribed construction of the electrodes, the pulverulent catalyst material separates readily from the cover layer whereby current interruptions in the separated regions can occur during the operation of the cell.

In accordance with my invention, I therefore provide electrodes of pulverulent catalysts for electrochemical cells which are improved by means of a binder medium that bonds the pulverulent catalyst particles with the porous cover layer located on the side of the electrolyte. Materials which are exceptionally suitable as binding means for the pulverulent catalyst material as well as for bonding the catalyst layer with the cover layer, and which also form no pore-free film after being applied but rather form an electrolyte- and gas-permeable frame, are for example Teflon powder, Plexiglas powder, polyethylene powder or powdered glass. The binding medium can also be supplied in the form of a commercially available dispersion.

Non-polymerized pastes can also be employed for the just-mentioned purpose. The inventive application of the pulverulent active catalyst material on the cover layer as well as the bonding of the catalyst particles to one another can be carried out by mixing the electrode material with the binding agent and subsequently pressing the mixture onto the cover layer using slight pressure at temperatures of 50 to 500° C.

Another feature of the invention is to add a filler to the catalyst-binding agent mixture for producing the electrode, the filler being capable of being dissolved out again after the resulting mixture is sintered onto the cover layer. For the aforementioned purpose, filler material of, for example, MgO or NaCl can be used. The foregoing step permits the manufacture of electrodes which differ from the electrodes produced solely from catalyst-binder mixture by the fact that they have a coarser pore diameter.

Further details are described in the following examples with reference to the electrodes and fuel cell illustrated in the drawing and described hereinbefore.

Example 1

For producing an oxygen electrode, activated charcoal powder coated with silver was mixed with polyethylene powder in a 2:1 ratio by weight and subsequently bonded to asbestos paper by the application of a slight pressure at 150 to 200° C. For conducting current away from the cell, a silver meshwork was pressed onto the thus produced electrode, and the asbestos paper was saturated with a solution of 30% KOH. The oxygen pressure on the electrode side was 0 to 1 atm.

Example 2

For producing a hydrogen electrode suitable for use with acidic electrolytes, platinum black or mohr and glass powder were mixed in a ratio of 1:1 and then sintered with a glass frit just beneath the point at which the glass powder begins to soften, attention being given to the fact that the pore diameter of the glass frit is smaller than the pore diameter of the catalyst electrode. After the electrode was saturated with 83% $H_3PO_4$, it was able to be used at low $H_2$ super-pressure for temperatures up to 150° C.

Example 3

For producing a propane electrode, a mixture of Teflon dispersion and platinum black (with a ratio by weight of platinum to Teflon of 3:1) was applied uniformly on glass fiber paper, dried, and sintered under light pressure at 300° C. In 5 N $H_2SO_4$ or in an 83% solution of $H_3PO_4$ as electrolyte, the electrode operated with propane gas. For high currents, a tantalum meshwork can be pressed onto the electrode for drawing off the current.

I claim:

1. In an electrochemical cell including a flexible plate member having a porous supporting structure and a non-metallic cover layer abutting the structure on at least one side thereof, the cover layer being gas-tight and ion-conducting; at least one electrode in area contact with the non-metallic cover layer of the plate member, the electrode being formed of pulverulent catalyst material, and a gas-permeable sheet member of good conducting material located adjacent the pulverulent material for holding the pulverulent material pressed against the flexible plate member, the improvement therein of the one electrode further comprising binder material intermixed with the pulverulent catalyst material and bonding the particles of pulverulent material to one another and to the cover layer.

2. Electrode assembly for an electrochemical cell having a side engageable with reaction gas in the cell and a side engageable with electrolyte in the cell, the electrode assembly comprising a non-metallic, gas-impermeable, ion or conducting cover layer on the electrolyte-engaging side thereof, and a layer formed of pulverulent catalyst material located on the gas-engaging side thereof and intermixed with binder material bonding the particles of pulverulent material to one another, and to the cover layer.

3. Electrode according to claim 2 wherein said binder material consists of polytetrafluoroethylene powder.

4. Electrode according to claim 2 wherein said binder material consists of methyl methacrylate powder.

5. Electrode according to claim 2 wherein said binder material consists of polyethylene powder.

6. Electrode according to claim 2 wherein said binder material consists of powdered glass.

References Cited

UNITED STATES PATENTS

| | | | |
|---|---|---|---|
| 3,235,473 | 2/1966 | Le Duc. | |
| 3,252,839 | 5/1966 | Langer et al. | 136—86 |
| 3,297,484 | 1/1967 | Niedragh | 136—86 |
| 3,385,780 | 5/1968 | Feng | 204—294 |

JOHN H. MACK, Primary Examiner

D. R. JORDAN, Assistant Examiner

U.S. Cl. X.R.

136—120; 204—275